(12) United States Patent
Chatterjee et al.

(10) Patent No.: US 8,417,047 B2
(45) Date of Patent: Apr. 9, 2013

(54) NOISE SUPPRESSION IN LOW LIGHT IMAGES

(75) Inventors: Priyam Chatterjee, Santa Clara, CA (US); Neel Joshi, Seattle, WA (US); Sing Bing Kang, Redmond, WA (US); Yasuyuki Matsushita, Beijing (CN)

(73) Assignee: Microsoft Corporation, Redmond, WA (US)

( * ) Notice: Subject to any disclaimer, the term of this patent is extended or adjusted under 35 U.S.C. 154(b) by 94 days.

(21) Appl. No.: 13/037,366

(22) Filed: Mar. 1, 2011

(65) Prior Publication Data
US 2012/0224789 A1 Sep. 6, 2012

(51) Int. Cl.
*G06K 9/40* (2006.01)
*H04N 9/14* (2006.01)

(52) U.S. Cl.
USPC ............................ 382/254; 382/260; 348/272

(58) Field of Classification Search .................. 382/167, 382/154, 254–267, 299, 300; 348/207.99, 348/222.1, 266, 272, 273, 280, 282, 207.1
See application file for complete search history.

(56) References Cited

U.S. PATENT DOCUMENTS

| | | | | |
|---|---|---|---|---|
| 5,986,668 | A * | 11/1999 | Szeliski et al. ................ | 345/634 |
| 6,816,197 | B2 * | 11/2004 | Keshet et al. ................. | 348/273 |
| 7,440,016 | B2 | 10/2008 | Keshet et al. | |
| 2005/0244052 | A1 | 11/2005 | Keshet et al. | |
| 2008/0253652 | A1 * | 10/2008 | Gupta et al. .................. | 382/167 |
| 2009/0310872 | A1 | 12/2009 | Sibiryakov et al. | |
| 2010/0085452 | A1 * | 4/2010 | Hirakawa et al. ............. | 348/273 |
| 2010/0092082 | A1 * | 4/2010 | Hirakawa et al. ............. | 382/167 |
| 2011/0268328 | A1 * | 11/2011 | Bar-Aviv et al. ............. | 382/128 |

OTHER PUBLICATIONS

Priyam Chatterjee, Neel Joshi, Sing Bing Kang, and Yasuyuki Matsushita, Noise Suppression in Low-Light Images through Joint Denoising and Demosaicing in Proceedings of Computer Vision and Pattern Recognition (CVPR), Apr. 2011.*
Deledalle, et al, Iterative Weighted Maximum Likelihood Denoising With Probabilistic Patch-Based Weights, IEEE Transactions on Image Processing, vol. 18, No. 12, Dec. 2009.*
Hirakawa et al, Joint Demosaicing and Denoising, IEEE Transactions on Image Processing, vol. 15, No. 8, Aug. 2006.*
Mairal, J.; Bach, F.; Ponce, J.; Sapiro, G.; Zisserman, A.;, "Non-local sparse models for image restoration," Computer Vision, 2009 IEEE 12th International Conference on , vol., no., pp. 2272-2279, Sep. 29, 2009-Oct. 2, 2009.*
Park, et al., "A case for denoising before demosaicking color filter array data", Retrieved at << http://graphics.stanford.edu/~shpark7/projects/demden/Asilomar09_cfadenoise.pdf >>, Asilomar Conference on Signals, Systems and Computers, 2009, pp. 5.

(Continued)

*Primary Examiner* — Andrae S Allison

(57) ABSTRACT

A low light noise reduction mechanism may perform denoising prior to demosaicing, and may also use parameters determined during the denoising operation for performing demosaicing. The denoising operation may attempt to find several patches of an image that are similar to a first patch, and use a weighted average based on similarity to determine an appropriate value for denoising a raw digital image. The same weighted average and similar patches may be used for demosaicing the same image after the denoising operation.

20 Claims, 2 Drawing Sheets

OTHER PUBLICATIONS

Condat, Laurent., "A Simple, Fast and Efficient Approach to Denoisaicking: Joint Demosaicking and Denoising", Retrieved at << http://www.greyc.ensicaen.fr/~lcondat/publis/condat_icip10_denoisaicking.pdf >>, 17th IEEE International Conference on Image Processing (ICIP), Sep. 26-29, 2010, pp. 4.

Hirakawa, Keigo., "Color Filter Array Image Analysis for Joint Denoising and Demosaicking", Retrieved at << http://www.accidentalmark.com/research/papers/Hirakawa08DemosaickingDenoising_CRC.pdf>>, 2008, pp. 1-30.

Azzabou, et al., "Variable Bandwidth Image Denoising Using Image-based Noise Models", Retrieved at << http://vision.mas.ecp.fr/pub/cvpr07-02.pdf >>, IEEE Computer Society Conference on Computer Vision and Pattern Recognition (CVPR), Jun. 18-23, 2007, pp. 7.

Bennett, et al., "Video and image bayesian demosaicing with a two color image prior", Retrieved at << http://research.microsoft.com/pubs/75552/Bennett-ECCV06.pdf >>, Computer Vision—ECCV, 9th European Conference on Computer Vision, May 7-13, 2006, pp. 508-521.

Buades, et al., "A non-local algorithm for image denoising", Retrieved at << http://citeseerx.ist.psu.edu/viewdoc/download?doi=10.1.1.103.9157&rep=rep1&type=pdf >>, IEEE Computer Society Conference on Computer Vision and Pattern Recognition, Jun. 20-25, 2005, pp. 6.

Buades, et al., "Self-similarity driven color demosaicking", Retrieved at << http://hal.archives-ouvertes.fr/docs/00/44/93/62/PDF/manuscript.pdf >>, IEEE Transactions on Image Processing, vol. 18, No. 6, 2009, pp. 1-11.

Hirakawa, et al., "Joint demosaicing and denoising", Retrieved at << http://ieeexplore.ieee.org/stamp/stamp.jsp?tp=&arnumber=1530390 >>, IEEE Transactions on Image Processing, 2005, pp. 4.

Zhang, et al., "PCA-based spatially adaptive denoising of CFA images for single-sensor digital cameras", Retrieved at << http://www4.comp.polyu.edu.hk/~cslzhang/PCA_CFA_DN/CFA_Denoising.pdf >>, IEEE Transactions on Image Processing, vol. 18, No. 4, Apr. 2009, pp. 797-812.

\* cited by examiner

NOISE SUPPRESSION IN LOW LIGHT IMAGES

BACKGROUND

Digital images are ubiquitous, and can be captured by digital cameras, cellular telephones, video cameras, and many different devices. Many of the images may be shot in low light conditions, or may have portions of the image that are underexposed. In many cases, common noise suppression algorithms may cause repeating blotch patterns to be generated in the low light areas.

SUMMARY

A low light noise reduction mechanism may perform denoising prior to demosaicing, and may also use parameters determined during the denoising operation for performing demosaicing. The denoising operation may attempt to find several patches of an image that are similar to a first patch, and use a weighted average based on similarity to determine an appropriate value for denoising a raw digital image. The same weighted average and similar patches may be used for demosaicing the same image after the denoising operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
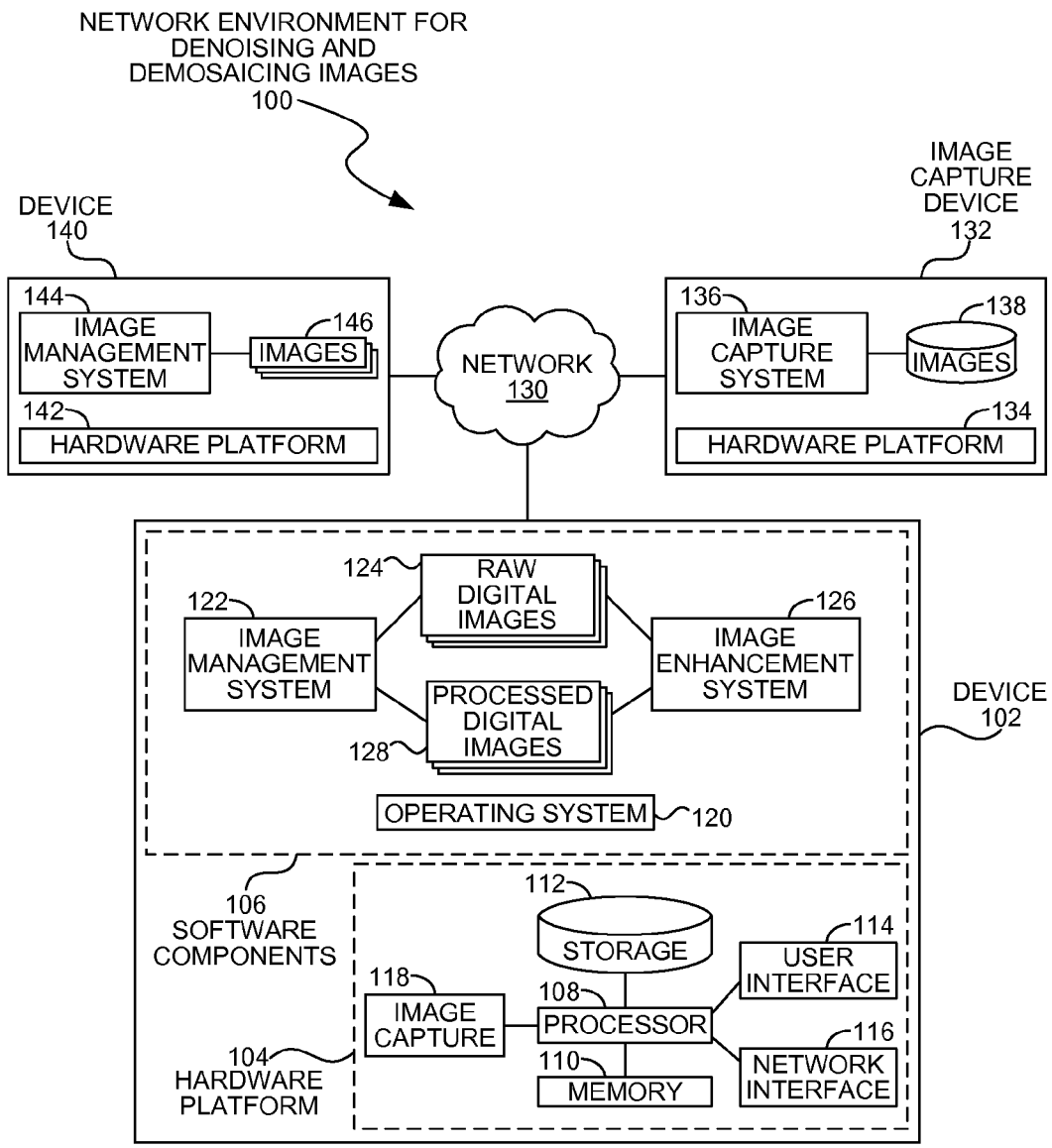
FIG. 1 is a diagram illustration of an embodiment showing a system for processing digital images.

A processing system for raw digital images may process low light portions of an image by analyzing patches of the image. For each image patch, a set of similar patches may be identified within the same image. The set of similar patches may be ranked and weighted based on their similarity to the patch being analyzed, and a weighted average of the similar patches may be used to generate a denoised value for the patch.

After denoising, the denoised raw digital image may be demosaiced to reconstruct the full color image from the incomplete sample image of the raw digital image. When demosaicing, the same set of similar patches with the same ranking and weighting may be used to determine appropriate values during the demosaicing process.

In some embodiments, the low light processing algorithm may be used only on those portions of the image that are low light portions. In other embodiments, the low light processing algorithm may be applied to the entire image.

Some embodiments may be deployed as a post processing service that may be a computer application executing on a personal computer, or a cloud service that may process and enhance photos uploaded to the cloud service. In some embodiments, the low light processing algorithm may be performed by the camera device itself.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system that may perform low light denoising and demosaicing for raw digital images. Embodiment 100 is a simplified example of an environment that may perform low light image enhancement either as part of a camera or other image capture device, or as a service for images captured and managed by other devices.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates a generic computer environment in which image processing may be performed. The image processing may analyze low light images or low light portions of images to jointly denoise and demosaic images. The denoising portion may use a technique where similar patches of the image may be weighted, averaged, and a denoised value determined for each patch within the low light area or image. The same set of similar patches and weights may be used for demosaicing to generate a high definition, denoised image.

The image enhancement may be performed by a device 102. The device 102 is illustrated having hardware components 104 and software components 106. The device 102 as illustrated represents a conventional computing device, although other embodiments may have different configurations, architectures, or components.

In many embodiments, the device 102 may be a personal computer or server computer. In some embodiments, the device 102 may still also be a laptop computer, netbook computer, tablet or slate computer, wireless handset, cellular telephone, or any other type of computing device. In still other embodiments, the device 102 may be a digital camera, video camera, or other photographic or video device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The device 102 may include an image capture component 118, which may be a digital camera capable of capturing an image. In many embodiments, the image capture component 118 may be a single sensor with a color filter array. One example of a color filter array may be a Bayer filter, where the color filter has twice as many green pixels as red and blue pixels.

The software components 106 may include an operating system 118 on which various applications and services may operate. An operating system may provide an abstraction layer between executing routines and the hardware components 104, and may include various routines and functions that communicate directly with various hardware components.

The applications executing on the operating system 118 may include an image management system 122 that may receive images to enhance. In some embodiments, the image management system 122 may allow a user to organize, sort, edit, print, and perform various other operations.

The image management system 122 may receive raw digital images 124 from the image capture component 118, or from other devices.

The raw digital images 124 may be processed by an image enhancement system 126 to produce processed digital images 128. In some embodiments, the image enhancement system 126 may process each raw digital image 124 in a batch mode where the image enhancement may be performed on a series of images in a queue. In other embodiments, the image enhancement system 126 may perform image enhancement on images on a real time or near-real time basis by receiving images as the images are captured and processing the images without delay.

In some embodiments, the device 102 may process images captured on other devices. An image capture device 132 may be connected to the device 102 through a network 130. The image capture device 132 may capture images and may transmit the images to the device 102 for low light enhancement.

The image capture device 132 may represent a camera device, such as a digital single lens reflex camera, a pocket camera, a camera on a cellular telephone or other device, or any other device capable of capturing a raw digital image. The image capture device 132 may have a hardware platform 134 that may include an image capture component, lenses, and other optical components.

The image capture device 132 may also include an image capture system 136 that may capture and process images for storage as a set of images 138. The image capture system 136 may allow a user to compose, preview, edit, and capture images. In many embodiments of a digital camera, the image capture system 136 may be the software system that may create a user interface and process images based on user input.

The image capture device 132 may capture images but may not have the ability to perform low light image enhancement. In such a case, images may be transmitted from the image capture device 132 to the device 102 for image enhancement. After processing, the images may be returned to the image capture device 132 or transmitted to another system for storage and viewing.

An example of such a system may be a device 140, which may provide image management services. Such a system may be, for example, a personal computer in a user's home where the user's images may be stored. In such an embodiment, the user may have a camera as an image capture device, and images generated by the camera may be transmitted to the device 102 for processing. The resulting processed images may be stored and used by the device 140.

The device 140 may have a hardware platform 142 on which an image management system 144 may operate on various images 146. The image management system 144 may allow a user to browse images, store and manipulate images, including editing the images. In some embodiments, the low light image enhancement process may be computationally expensive. In such embodiments, a user on the device 140 may transmit images to the device 102 for enhancement. In some such embodiments, the device 102 may be a cloud computing platform with an image enhancement service.

Figure 2:
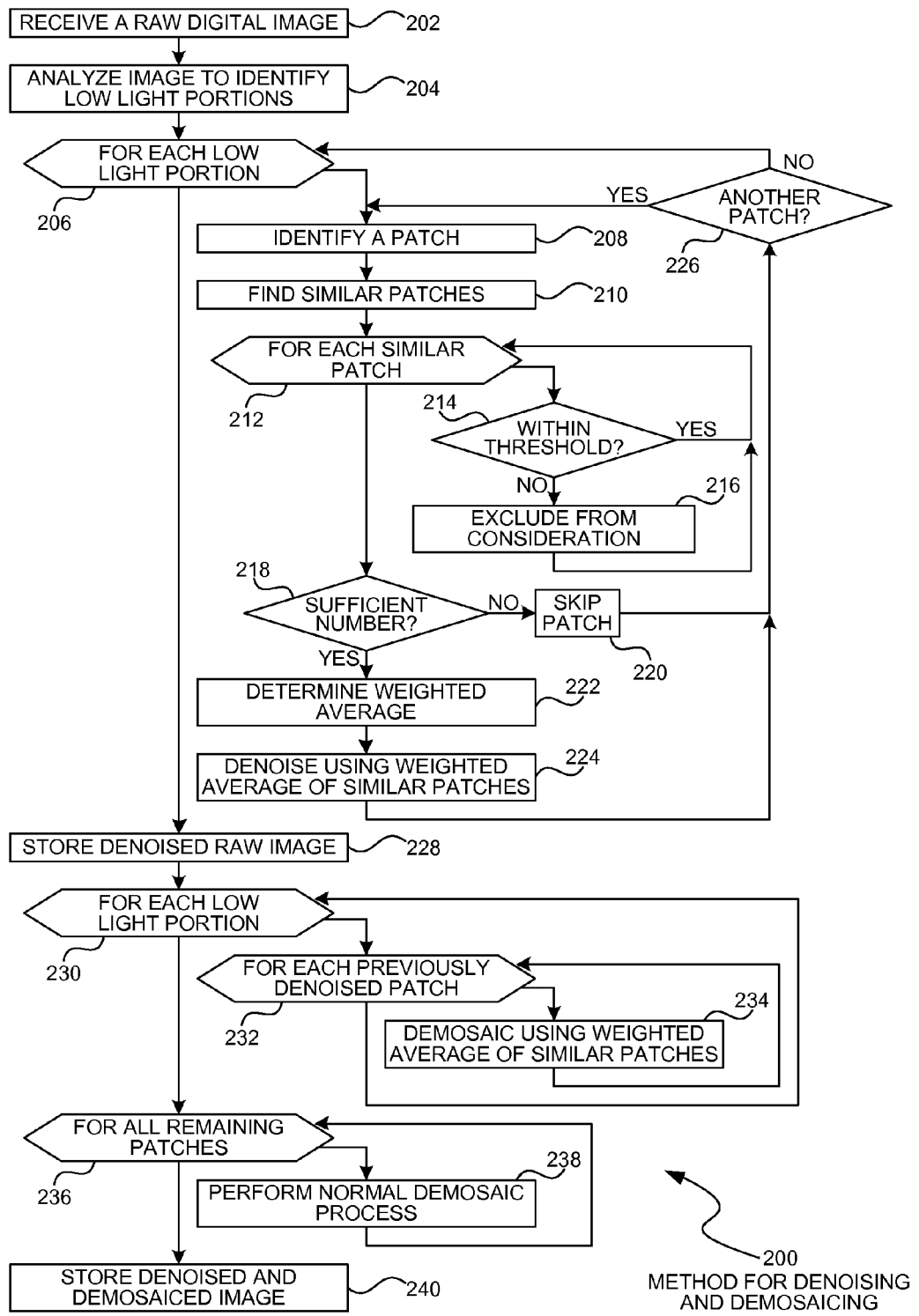
FIG. 2 is a flowchart illustration of an embodiment showing a method for denoising and demosaicing images.

FIG. 2 is a flowchart illustration of an embodiment 200 showing a method for denoising and demosaicing a raw digital image. The process of embodiment 200 is a simplified example of one method for denoising and demosaicing an image, where the process may be applied to just the low light portions of an image.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 may represent a method for denoising and demosaicing a raw image. The method of embodiment 200 may apply a weighted average of similar patches to determine a denoised value for the patch, then use the same weighted average of similar patches when performing demosaicing. The method of embodiment 200 may skip patches where the similar patches are not sufficiently similar, and may skip the denoising process when enough similar patches are not available.

A raw digital image may be received in block 202. The raw digital image may be an image created with a single sensor and a color filter array. A color filer array may filter individual pixels to specific colors. One such filter mechanism may be the Bayer filter, where each block of four pixels may be assigned to two green pixels, one blue pixel, and one red pixel. From such an image, the process of denoising may reduce noise in low light areas, which may have smaller signal to noise ratios.

After denoising, the process of demosaicing may assign red, blue, and green color values for each pixel to render a high density image. A demosaicing process may reconstruct a high density image from incomplete color samples that are output from a single sensor color filter array camera.

In block 204, low light portions of the image may be identified. In some embodiments, the denoising and demosaicing process described for the low light images may be applied to an entire image, regardless if the image contains low light areas or not. In the embodiment 200, a low light denoising and demosaicing process may be applied just to the low light areas and not to other areas of the image. Such an embodiment may be useful in cases where the low light denoising and demosaicing process may be computationally expensive.

For each low light portion of the image in block 206, an image patch may be identified. The image patch may be a segment of the image to process, and may contain several pixels. Various embodiments may use image patches that may contain four, eight, sixteen, thirty two, sixty four, or more pixels. In some embodiments, the patch may be square or rectangular, while in other cases, the patch may be round, ellipsoid, or some other shape. As the patch becomes bigger, the denoising process may render smoother results at the expense of more computations.

The patch may be centered around a single pixel for which a denoised value may be sought. In an embodiment where the entire image may be denoised and demosaiced using the process of embodiment 200, an image may have the same number of patches as pixels.

In block 210, similar patches may be found in the image. A similar patch may have similar values to the first patch and may be found within the image. The similar patches may be used to determine a denoised value for an individual pixel within the patch.

When analyzing other patches, the similarity between the first patch and the other patches may be represented as a vector distance from the first patch to each of the other patches. Those patches with the smallest distance to the first patch may be selected as similar patches.

A group of similar patches may be selected as part of block 210. In some embodiments, a maximum number of similar patches may be analyzed. The maximum number may be two, four, ten, fifty, one hundred, or some other number of similar patches.

In some embodiments, the similar patches may be taken from any area of the image, including the same or another low light portion or even a patch taken from outside the low light portion. In some embodiments, the similar patches may be restricted to come from the same low light portion or another low light portion. Some embodiments may limit similar patches to come from specific areas of the image in order to limit the comparisons used to identify similar patches.

For each similar patch in block 212, if the similar patch is within a similarity threshold in block 214, the patch may be used. If the similar patch is outside of a similarity threshold in block 214, the patch may be removed from consideration in block 216. The similarity threshold may be a maximum vector distance from the first patch to the similar patch being considered.

After screening patches for a threshold, if there are not a sufficient number of patches in block 218, the first patch may be skipped in block 220. Each embodiment may have different limits on the minimum number of patches. For example, some embodiments may proceed with one similar patch, two similar patches, or 10, 20, or similar patches. As the minimum number of similar patches increases, the smoother the denoising operation may be.

A weighted average may be determined for the similar patches in block 222. Using the weighted average, a denoised value for the patch may be determined in block 224. The denoised value may be for a single pixel within the patch. In some embodiments, the denoised value may be calculated for several pixels within the same patch. For example, a patch size of sixteen pixels may be used to determine the values of the four pixels at the center of the patch.

If the patch is skipped in block 220 or denoised in block 224, the process may return to block 226. If another patch may be available for processing in block 226, the process may return to block 208. Otherwise, the process may return to block 206 to process another low light portion.

After processing all of the low light portions in block 206, a denoised raw image may be stored in block 228. The demosaicing process may now be performed.

In block 230, each low light portion of the image may be analyzed. For each previously denoised patch in block 232, the patch may be demosaiced using the same weighted average of the similar patches as was used for denoising in block 224. The same weighted average may minimize blotches or various noise patterns that may occur when using conventional demosaicing processes on low light portions of an image.

For all remaining patches in block 236, a normal demosaicing process may be performed in block 238.

The denoised and demosaiced image may be saved in block 240.

In one embodiment, the denoising and demosaicing process may begin by forming patches centered at each [R, G, G, B] node in the image. The [R, G, G, B] node may represent a square set of pixels in a Bayer filtered raw image. For any given patch centered at $y_i$, the K-most similar patches with centers at $y_j$ within the image.

The center node of the patch $\hat{z}$ under consideration of similarity to $y_i$ as a linear combination of the similar patches to be in the form of $$\hat{z} = \sum_{j=1}^{N} w_{ij} y_j = Y_i w_i$$

where $Y_i$ may be the matrix formed by concatenating the vectorized center nodes of the similar patches $y_j$. The term $w_{ij}$ may be the weights that measure the confidence of a patch centered at $y_j$ is similar to that centered at $y_i$, and $w_i$ may be the vector containing $w_{ij}$ entries. The weights may be calculated in an optimization framework as $$\hat{w}_i = \underset{w_i}{\operatorname{argmin}} \|y_i - Y_i w_i\|_{p_i}^p$$

with p chosen to fit the error distribution. In some embodiments, p may equal 1.

The process may be repeated for blocks with different patterns, namely [G, R, B, G], [G, B, R, G], and [B, G, G, R]. The blocks may be matched with other blocks having the same patterns. In some embodiments, an embedded learning process may be carried out for each pattern to obtain multiple denoised estimates of an image. The final estimate may be an average of the multiple estimates. The secondary averaging process may reduce the residual noise in the initial estimates.

The demosaicing may be performed using an optimizing framework. Specifically, $$\tilde{r} = (W-I)Dr^{un} = \tilde{W}r^{un}$$

where D is a matrix operator where each row implements a summation of the unobserved samples corresponding to the observed samples r. W is a sparse matrix with $w_{ij}$ as its i, j-th entry. $\tilde{r} = r - Wr$ is a function of observed samples only, and $\tilde{W} = (W-I)D$ with I as the identity matrix. In the demosaicing step, $r^{un}$ is estimated given the estimated $\tilde{W}$ and $\tilde{r}$. The final estimate for the demosaiced image may be obtained for solving for the unknown intensities as:

$$r^{un} = _{r^{un}}\operatorname{argmin} \|\tilde{r} - \tilde{W}r^{un}\|_p^p + \|\Lambda(r^{un} - r_0^{un})\|_q^q$$

where $\Lambda$ is a diagonal matrix with varying diagonal entries that may allow control the penalty for deviating from an initial estimate, and p and q may be chosen according to the distribution of the error for the data fitting and regularization terms. In some embodiments, p=q=1 may be used.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   receiving a raw digital image comprising pixel information;
   identifying a first patch comprising a plurality of pixels;
   identifying a plurality of patches similar to said first patch;
   for each of said plurality of patches, determining a similarity between each of said plurality of patches and said first patch;
   determining a weighted average for said plurality of patches based on said similarity; and
   using said weighted average to determine a denoised version of said raw digital image.

2. The method of claim 1 further comprising:
   using said weighted average to determine a demosaiced version of said denoised version of said raw digital image.

3. The method of claim 1, said first patch being within a low light area of said image.

4. The method of claim 3 further comprising:
   identifying a portion of said image being a low light portion and performing said method on said low light portion.

5. The method of claim 4, said plurality of patches being within said low light portion.

6. The method of claim 4, said method not being performed on a portion of said image outside of said low light portion.

7. The method of claim 1, said first patch being a circular shaped patch.

8. The method of claim 1, said first patch being a rectangular shaped patch.

9. The method of claim 1, said first patch being greater than 16 pixels in size.

10. The method of claim 1, said first patch being greater than 50 pixels in size.

11. A system comprising:
    an image management system that includes one or more processors coupled to a memory, the one or more processors configured to receive a raw digital image comprising pixel information; and
    an image enhancement system that:
       identifies a first patch comprising a plurality of pixels within said raw digital image;
       identifies a plurality of patches similar to said first patch;
       for each of said plurality of patches, determines a similarity between each of said plurality of patches and said first patch;
       determines a weighted average for said plurality of patches based on said similarity; and
       uses said weighted average to determine a denoised version of said raw digital image.

12. The system of claim 11, said image enhancement system that further:

uses said weighted average to determine a demosaiced version of said denoised version of said raw digital image.

13. The system of claim 11, said image enhancement system that further:
analyzes said raw digital image to identify a low light area of said image.

14. The system of claim 13, said first patch being within the low light area of said image.

15. The system of claim 14, said image enhancement system that does not perform said identifies a first patch, identifies a plurality of patches similar to said first patch, determines a similarity, determines a weighted average, and uses said weighted average to determine a denoised version, on a portion of said image outside of said low light area.

16. The system of claim 11, said image enhancement system that further:
determines that at least one of said plurality of patches does not have a similarity within a predefined similarity threshold and removes said at least one of said plurality of patches from said weighted average.

17. The system of claim 16, said image enhancement system that further:
determines that an insufficient number of said plurality of patches are within said predefined similarity threshold and does not perform said denoising for said first patch, wherein the insufficient number is determined as being less than a predetermined minimum number.

18. A method comprising:
receiving a raw digital image comprising pixel information, said pixel information being Bayer filtered pixel information;
identifying a first patch comprising at least 16 pixels;
identifying a plurality of patches similar to said first patch;
for each of said plurality of patches, determining a similarity between each of said plurality of patches and said first patch;
determining a weighted average for said plurality of patches based on said similarity;
using said weighted average to determine a denoised version of said raw data; and
using said weighted average to determine a demosaiced version of said denoised version of said raw digital image.

19. The method of claim 18 further comprising:
for each of said plurality of patches, comparing said similarity to a predefined similarity threshold and removing those patches that do not meet said predefined similarity threshold.

20. The method of claim 19 further comprising:
determining that a minimum number of said plurality of patches do not meet said predefined similarity threshold and not denoising said first patch.

* * * * *